(12) United States Patent
Szymbor et al.

(10) Patent No.: US 6,996,885 B2
(45) Date of Patent: Feb. 14, 2006

(54) METHOD OF MAKING BRISTLE ARRANGEMENT FOR BRUSH SEAL

(75) Inventors: John A. Szymbor, Sanford, ME (US); Mark E. Addis, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 88 days.

(21) Appl. No.: 10/103,629

(22) Filed: Mar. 20, 2002

(65) Prior Publication Data
US 2003/0178777 A1    Sep. 25, 2003

(51) Int. Cl.
B23P 23/00    (2006.01)
F01D 11/02    (2006.01)

(52) U.S. Cl. .............. 29/402.02; 29/888.3; 29/402.08; 29/402.03; 277/355

(58) Field of Classification Search .............. 29/888.3, 29/402.02, 402.03–402.08, 402.01, 401.1, 29/8; 277/355 X; 63/15
See application file for complete search history.

(56) References Cited

U.S. PATENT DOCUMENTS

| | | | | |
|---|---|---|---|---|
| 4,471,634 A | * | 9/1984 | Kaplan ....................... 63/15.6 |
| 4,781,388 A | | 11/1988 | Wohrl et al. ................ 277/355 |
| 5,110,033 A | * | 5/1992 | Noone et al. ............... 29/888.3 |
| 5,590,450 A | * | 1/1997 | March ............................ 29/8 |
| 5,732,466 A | * | 3/1998 | Bouchard ................... 29/888.3 |
| 5,975,535 A | | 11/1999 | Gail et al. .................. 277/355 |
| 6,062,463 A | | 5/2000 | Hoffmueller et al. ...... 29/888.3 |
| 6,120,622 A | * | 9/2000 | Mayr et al. ................ 29/888.3 |
| 6,131,911 A | * | 10/2000 | Cromer et al. .............. 277/355 |
| 6,192,708 B1 | * | 2/2001 | Mitchell ..................... 63/15.6 |
| 6,257,588 B1 | | 7/2001 | Bagepalli et al. ........... 277/355 |
| 6,318,728 B1 | | 11/2001 | Addis et al. |
| 6,328,311 B1 | | 12/2001 | Plona et al. ................ 277/355 |

FOREIGN PATENT DOCUMENTS

| | | |
|---|---|---|
| EP | 1 288 540 | 5/2003 |
| GB | 1 541 001 | 2/1979 |

* cited by examiner

*Primary Examiner*—Marc Jimenez
(74) *Attorney, Agent, or Firm*—Bachman & LaPointe, P.C.

(57) ABSTRACT

A method of making a bristle arrangement for a brush seal, which includes: providing a bristle arrangement; severing the bristle arrangement, the bristle arrangement now having free ends; and joining the free ends. A method of reworking a bristle arrangement for a brush seal, which includes the steps of: providing a bristle arrangement; removing a section from the bristle arrangement; and adding a replacement section to the bristle arrangement.

11 Claims, 8 Drawing Sheets

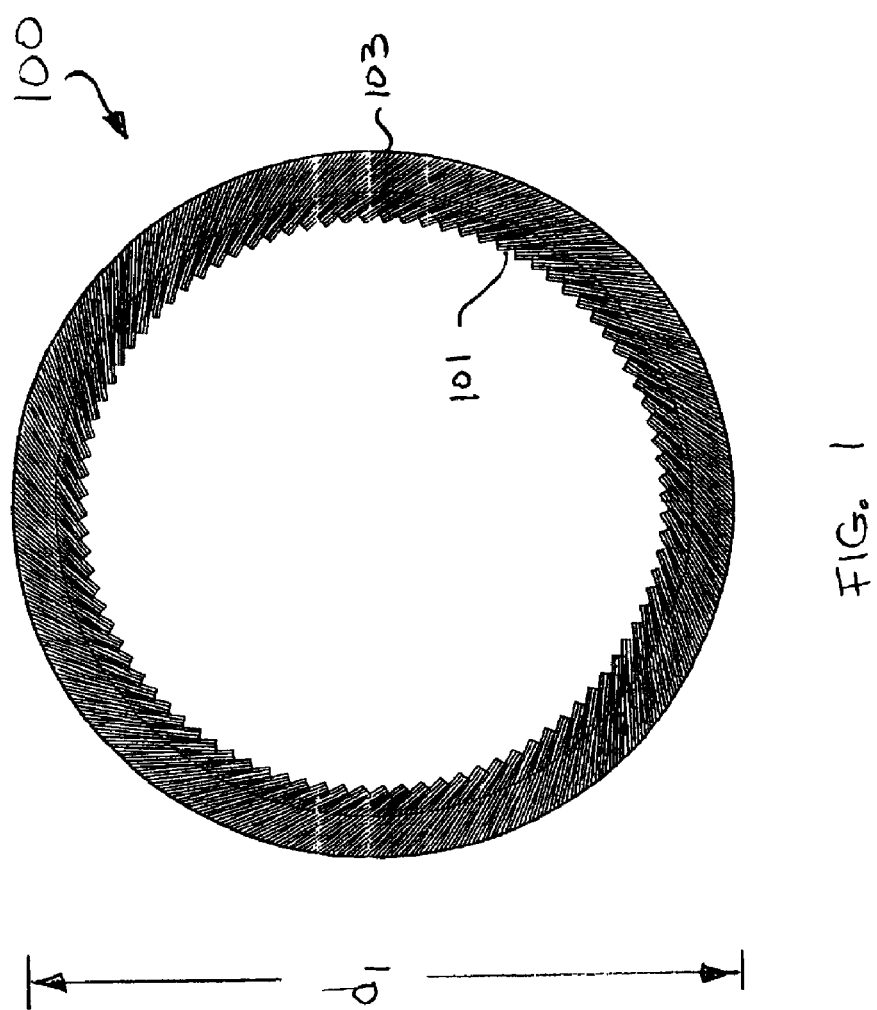

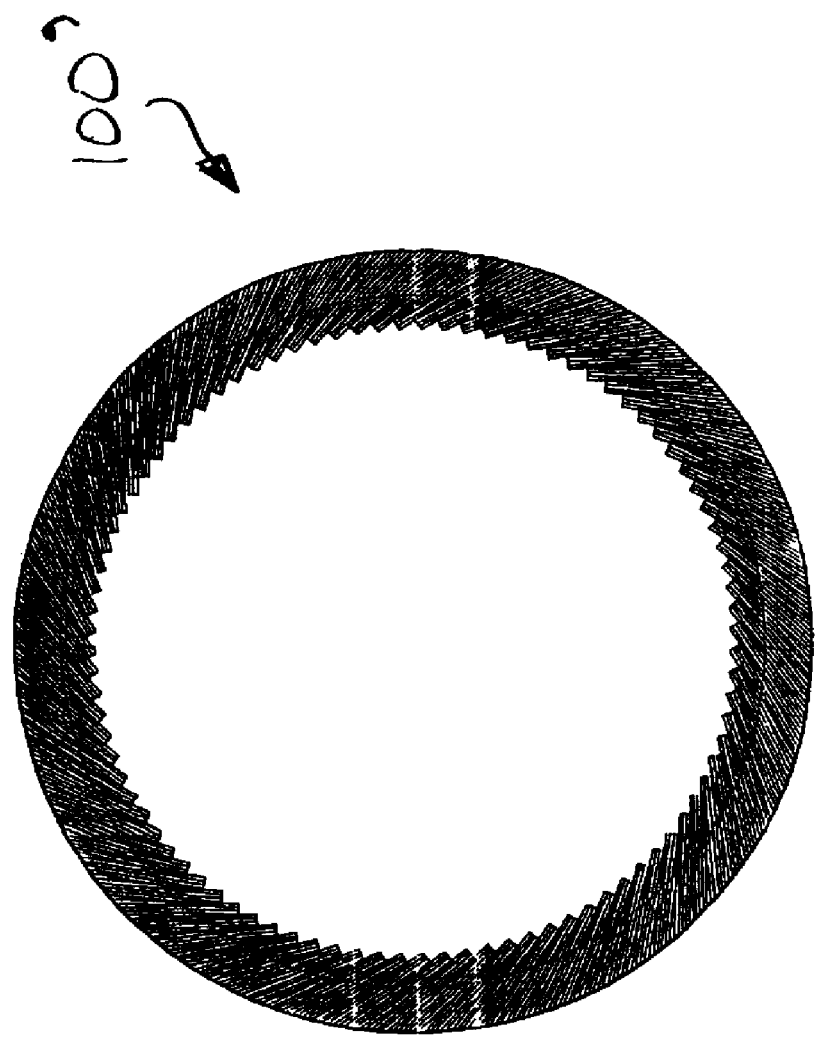
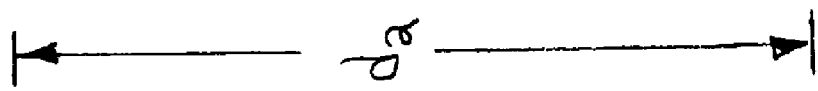
FIG. 2b

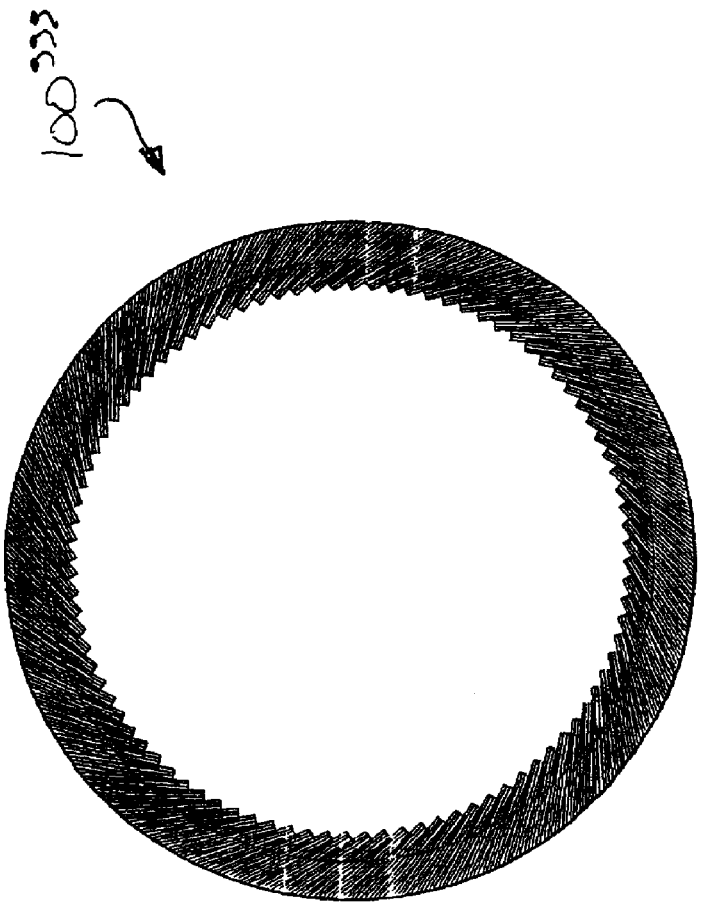
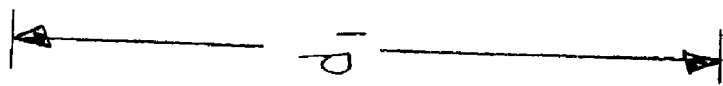
FIG. 4b

METHOD OF MAKING BRISTLE ARRANGEMENT FOR BRUSH SEAL

CROSS REFERENCE TO RELATED APPLICATIONS

This application is related to pending U.S. patent application Ser. No. 10/074,191 filed on 12 Feb. 2002, herein incorporated by reference.

BACKGROUND OF INVENTION

This invention relates to brush seals. Specifically, this invention relates to bristle arrangements for brush seals.

Gas turbine engines commonly use brush seals. The brush seals typically prevent secondary flow from escaping through a gap between a stationary part (e.g. a diffuser case) and a rotating part (e.g. a turbine shaft). The brush seal can have other uses, such as sealing a gap between stationary parts.

Several sub-assemblies form a brush seal. The sub-assemblies typically include packs of wire bristles and various plates. A one stage brush seal has a side plate and a back plate that sandwich the bristles therebetween. To increase capability, the engine could use a multiple stage brush seal. The multiple stages allow a greater pressure drop across the brush seal from the upstream side to the downstream side.

The design process and the assembly of conventional brush seals have several drawbacks. First, the sub-assemblies of a conventional brush seal are specific to a particular brush seal size. In other words, one cannot use the sub-assemblies from a larger brush seal to build a smaller brush seal. Nor could one use the sub-assemblies from a smaller brush seal to build a larger brush seal. The inability to use a sub-assembly in more than one brush seal size has an impact on inventory and space requirements. Assembling brush seals of different sizes requires keeping every sub-assembly in inventory. All of these sub-assemblies take up space.

Second, the fixtures used to make the conventional sub-assemblies are also specific to each sub-assembly size. One cannot use the fixture designed for a smaller sub-assembly to make a larger sub-assembly. Nor could one use the fixture designed for a larger sub-assembly to make a smaller sub-assembly. The inability to use a fixture for making more than one sub-assembly size also impacts inventory and space requirements. Assembling different size sub-assemblies requires keeping every fixture in inventory. All of these fixtures take up even more space.

Third, developing a new brush seal is time consuming. As described above, the operator cannot use a current sub-assembly to make a new size of brush seal. A designer would have to design all new sub-assemblies for the new size brush seal.

Fourth, developing a new brush seal can be costly. As described above, one cannot use the existing fixtures to make new size sub-assemblies. The designer, in addition to designing the brush seal sub-assemblies, would also have to design fixtures for each new part.

Fifth, current assembly techniques do not allow for the rework of certain sections of the brush seal. If the brush seal has unsuitable characteristics (e.g. the bristle pack), then the entire brush seal is usually scrapped.

SUMMARY OF INVENTION

It is an object of the present invention to provide a new and improved brush seal.

It is a further object of the present invention to provide a new and improved bristle arrangement.

It is a further object of the present invention to reduce sub-assembly inventory.

It is a further object of the present invention to use common sub-assemblies with different brush seal sizes.

It is a further object of the present invention to reduce fixture inventory.

It is a further object of the present invention to allow the use of a fixture of one size to produce a variety of brush seal sizes.

It is a further object of the present invention to allow the development of a new brush seal at a reduced cost.

It is a further object of the present invention to allow more rapid development of a new brush seal.

It is a further object of the present invention to allow rework of a brush seal.

It is a further object of the present invention to provide a bristle arrangement that can be reworked.

These and other objects of the present invention are achieved in one aspect by a kit for making brush seals. The kit includes: plates for a brush seal of a first size; plates for a brush seal of a second size different than the first size; and bristle arrangements compatible with the first size but not the second size. The bristle arrangements become compatible with the second size by removing a section from, or adding a section to, the bristle arrangements.

These and other objects of the present invention are achieved in another aspect by a method of making a bristle arrangement for a brush seal. The method comprises the steps of: providing a bristle arrangement; severing the bristle arrangement, which now has free ends; and joining the free ends.

These and other objects of the present invention are achieved in another aspect by method of reworking a bristle arrangement for a brush seal. The method comprises the steps of: providing a bristle arrangement; removing a section from said bristle arrangement; and adding a replacement section to the bristle arrangement.

BRIEF DESCRIPTION OF DRAWINGS

Other uses and advantages of the present invention will become apparent to those skilled in the art upon reference to the specification and the drawings, in which:

FIG. 1 is an elevational view of a bristle arrangement;

FIG. 2b is the bristle arrangement of FIG. 2a with the free ends reattached;

FIG. 4b is the bristle arrangement and the section of bristle arrangement of FIG. 4a secured together.

DETAILED DESCRIPTION

Figure 2A:
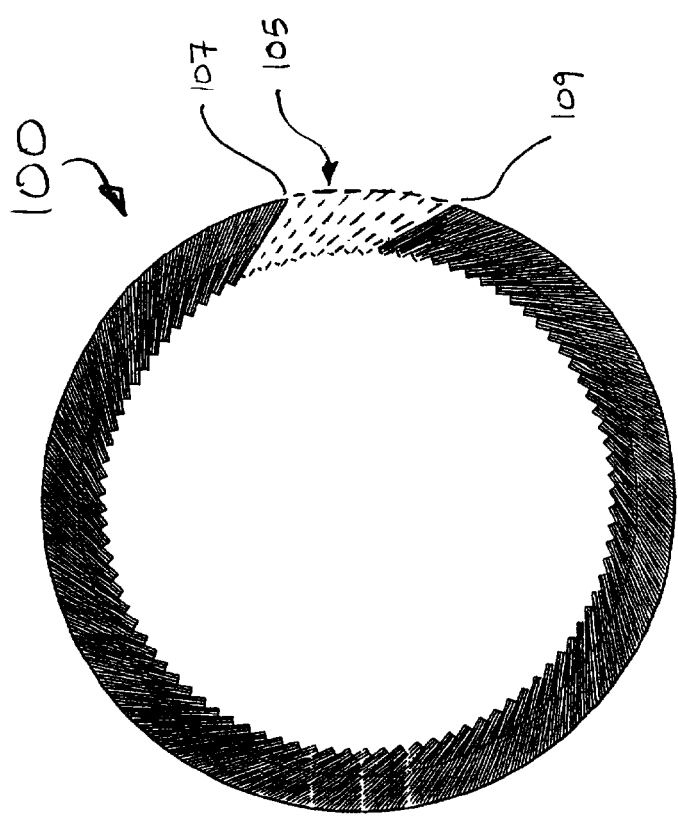
FIG. 2a is the bristle arrangement of FIG. 1 with a section removed.

FIG. 1 displays a bristle arrangement 100. Being annular, one could refer to the bristle arrangement shown in the figures as a bristle ring. In this annular configuration, the bristle arrangement 100 has a diameter $d_1$. The bristle arrangement 100 could, however, have other shapes. For example, the bristle arrangement could be arcuate (not shown) or linear (not shown).

The bristle arrangement 100 includes a plurality of bristles 101 secured together by a joint 103. The bristles 201 could be made from any suitable metallic material, preferably 0.002", 0.003", 0.004 or 0.006" diameter cobalt alloy wire.

The joint 103 extends continuously along the length of the bristle arrangement 100. Preferably, the operator produces the joint 103 by welding the bristles 101 together while placed in a fixture (not shown). The operator, however, could use other methods to produce the joint 103. U.S. patent application Ser. No. 10/074,191 describes in more detail the method of making the bristle arrangement 100. Each stage of a brush seal uses one of the bristle arrangements 100.

Figure 3A:
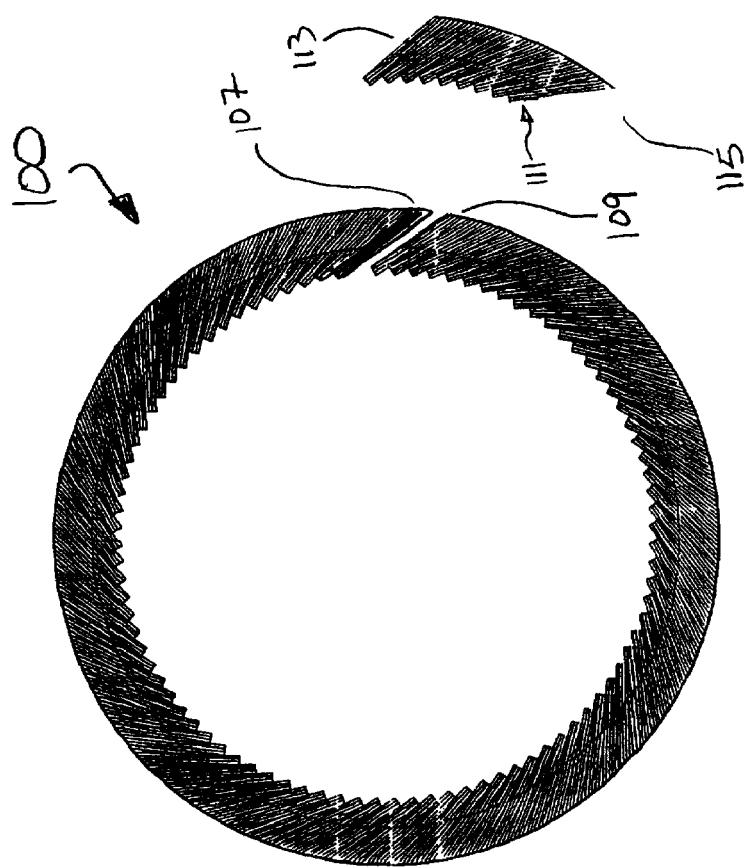
FIG. 3a is the bristle arrangement of FIG. 1, split, and a section of another bristle arrangement.
Figure 3B:
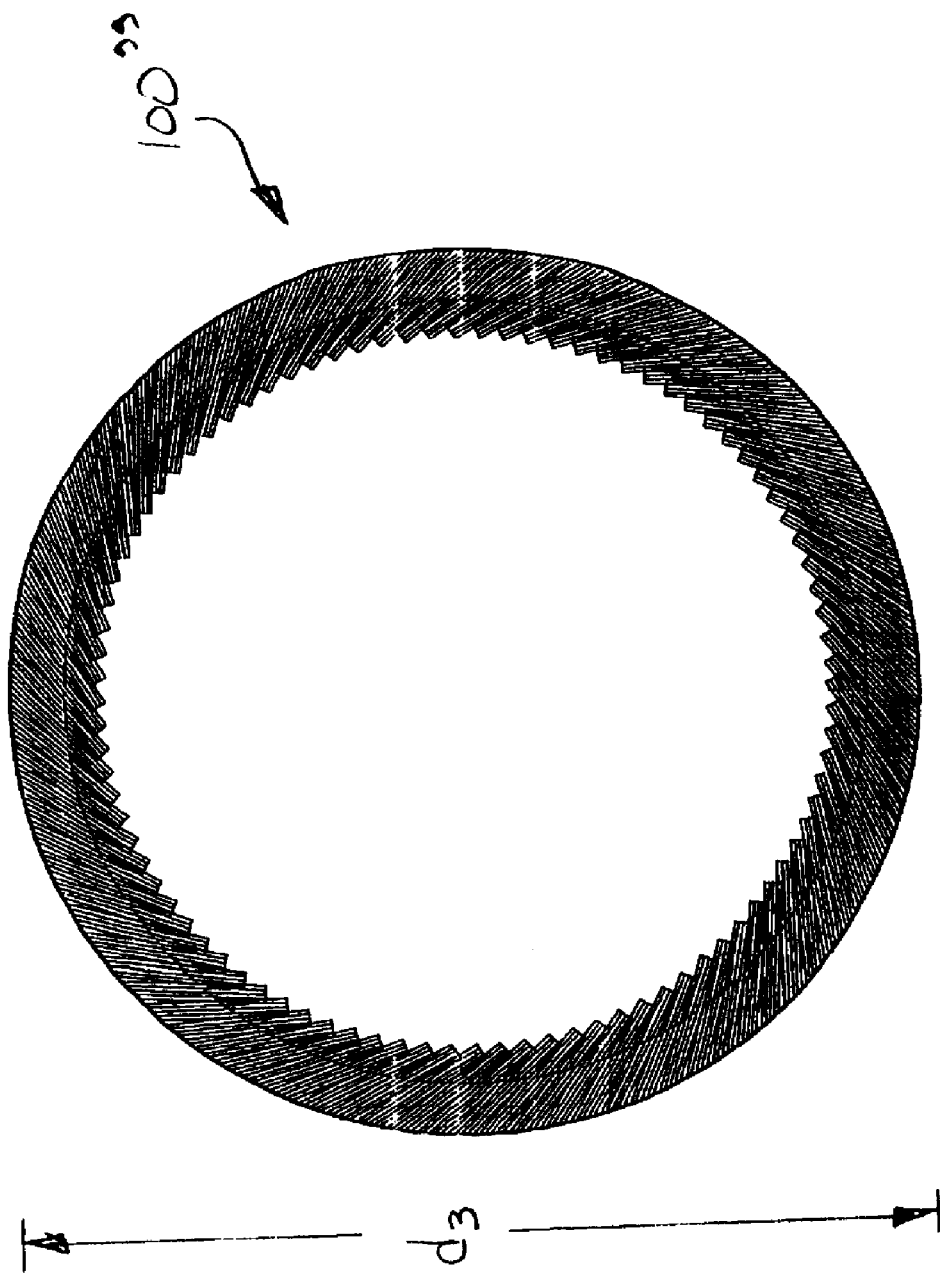
FIG. 3b is the bristle arrangement and the section of bristle arrangement of FIG. 3a attached together.

The present invention allows the use of one size of bristle arrangements 100 in different sizes of brush seals. FIGS. 2a and 2b demonstrate how the present invention alters the bristle arrangement 100 to fit in a smaller brush seal. FIGS. 3a and 3b demonstrate how the present invention alters the bristle arrangement 100 to fit in a larger brush seal.

The operator removes material from the bristle arrangement 100 to fit in a smaller brush seal. FIG. 2a displays the bristle arrangement 100 with a section 105 (shown in phantom) removed. The operator could remove the section 105 by cutting the joint 103 using a suitable technique. Such techniques could include, for example, a punch press (not shown), wire cutter (not shown), tin snip (not shown), electrical discharge machining (EDM) equipment (not shown) or a cut-off wheel (not shown).

Cutting the bristle arrangement 100 to remove the section 105 produces free ends 107, 109. The operator preferably reattaches the free ends 107, 109. The operator could place the free ends 107, 109 in a suitable fixture (not shown) and use a suitable technique to secure the free ends 107, 109 together. Such techniques include, for example, welding, brazing or using an adhesive like epoxy.

Note that the operator may not even need to reattach the free ends 107, 109. The operator could merely place the free ends 107, 109 in a generally abutting relationship when assembling the brush seal.

Securing the free ends 107, 109 together (or merely abutting the free ends 107, 109) reduces the size of the bristle arrangement 100'. FIG. 2b displays the bristle arrangement 100' after removing the section 105 and attaching the free ends 107, 109. The bristle arrangement 100' is again continuous and now has a diameter $d_2$ that is smaller than the original diameter $d_1$. The bristle arrangement 100' can now be used in a smaller brush seal than with the original bristle arrangement 100. For example, the present invention allows the use of a 6" outer diameter bristle arrangement in a brush seal with a 4.5" inner diameter.

The operator adds material to the bristle arrangement 100 to fit in a larger brush seal. FIG. 3a displays the bristle arrangement 100 split (and without a section removed). The operator could split the bristle arrangement 100 by any of the aforementioned severing techniques. The split produces the free ends 107, 109.

FIG. 3a also shows an additional section 111. The additional section 111 was preferably removed from another (not shown) bristle arrangement 100. The additional section 111 has free ends 113, 115.

The operator preferably secures the additional section 111 to the bristle arrangement 100. The operator could place the additional section 111 and the bristle arrangement 100 in a suitable fixture (not shown), then attach the free ends 107, 109, 113, 115. The operator could use any of the aforementioned attachment techniques to secure the free ends 107, 109, 113, 115 together.

As described above, the operator may not need to attach the free ends 107, 109, 113, 115. The operator could merely place the free ends 107, 109, 113, 115 in a generally abutting relationship when assembling the brush seal.

Adding the additional section 111 increases the size of the bristle arrangement 100". FIG. 3b displays the bristle arrangement 100" after splitting the bristle ring 100 and adding the additional section 111. The bristle arrangement 100" is again continuous and now has a diameter $d_3$ that is larger than the original diameter $d_1$. The bristle arrangement 100" can now be used in a larger brush seal than with the original bristle arrangement 100. For example, the present invention allows the use of a 6" outer diameter bristle arrangement in a brush seal with a 7.5" inner diameter.

The operator could take advantage of the present invention even without changing the diameter of the bristle arrangement 100. This allows the present invention, for example, to rework the bristle arrangement 100.

Figure 4A:
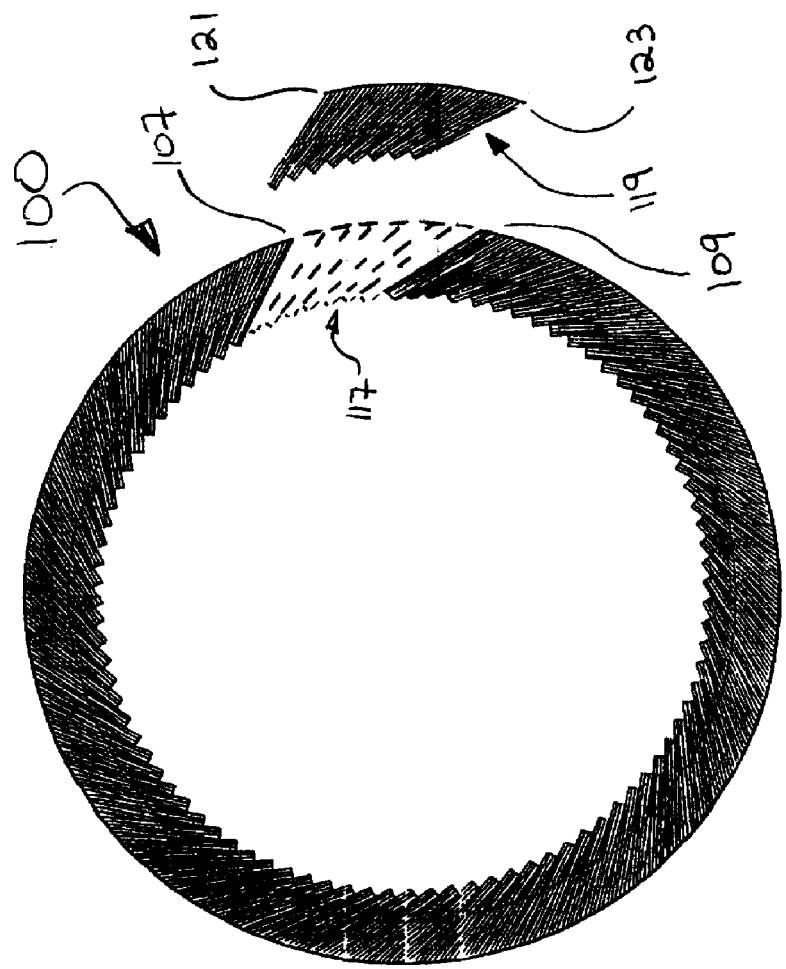
FIG. 4a is the bristle arrangement of FIG. 1 with a section removed and a section of another bristle arrangement.

FIG. 4a displays the bristle arrangement 100 with an unsuitable section 117 (shown in phantom) removed. The unsuitable section 117 could have, for example, unwanted aesthetic characteristics, damage, or improper bristle orientation.

The operator removes the unsuitable section 117 from the bristle arrangement 100 with any of the aforementioned cutting techniques. Removing the unsuitable section 117 produces the free ends 107, 109.

FIG. 4a also shows a replacement section 119. The replacement section 119 was preferably removed from another (not shown) bristle arrangement 100. The replacement section 119 has free ends 121, 123. As a replacement, the replacement section 119 preferably is the same size as the unsuitable section 117. However, other sizes could be used.

The operator preferably secures the free ends 107, 109, 121, 123 together. The operator could place the bristle arrangement 100 and the replacement section 119 in a suitable fixture (not shown) and use any of the aforementioned techniques to attach the free ends 107, 109, 121, 123.

As described above, the operator may not even need to attach the free ends 107, 109, 121 123. The operator could merely place the free ends 107, 109, 121, 123 in a generally abutting relationship.

FIG. 4b displays the bristle arrangement 100'" after removing the unsuitable section 117 and adding the replacement section 119. The bristle arrangement 100'" is again continuous. The bristle arrangement 100'" preferably retains the same diameter $d_1$ as the original bristle arrangement 100. Thus, the bristle arrangement 100'" can be used in the same size brush seal as the original bristle arrangement 100.

Figure 5:
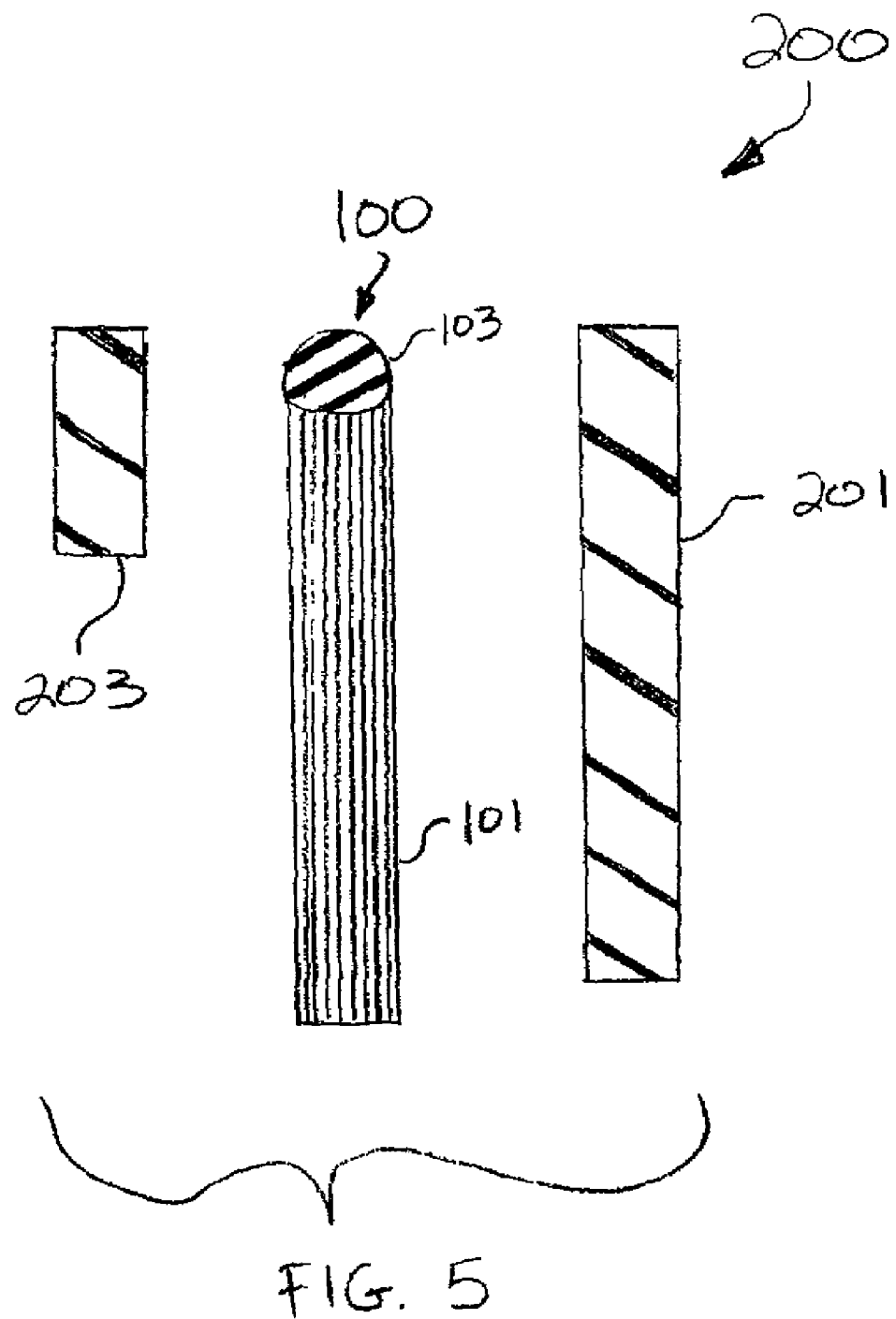
FIG. 5 is a cross-sectional view of a brush seal using the bristle arrangement of the present invention.

FIG. 5 displays one embodiment of a brush seal 200 that could use any of the bristle arrangements of the present invention. The single stage brush seal includes a back plate 201 and a side plate 203. When assembled, the metal plates 201, 203 flank the bristle arrangement 100. As one example, the brush seal 200 could be assembled by placing the plates 201, 203 and the bristle arrangement 100 in a fixture (not shown) and welding the sub-assemblies together.

Table 1 demonstrates the potential capabilities of the present invention. In a specific sense, the table shows that the present invention allows the use of one size bristle arrangement to produce multiple sizes of brush seals. For example, the table shows that a bristle arrangement having a 16" outer diameter can be used on any brush seal with an inner diameter of between 12" and 20".

In a broader sense, the present invention allows the use of selected sizes of bristle arrangements to produce a wide range of brush seal sizes. For example, the table shows that five sizes of bristle arrangements can produce a variety of brush seals ranging from 4.5" to 38" in diameter.

TABLE 1

| Bristle Arrangement OD (in.) | Min Brush Seal ID (in.) | Max Brush Seal ID (in.) |
| --- | --- | --- |
| 6 | 4.5 | 7.5 |
| 10 | 7.5 | 12.5 |
| 16 | 12 | 20 |
| 24 | 19 | 29 |
| 32 | 26 | 38 |

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method of making a bristle arrangement, which in subsequent combination with a first and second plate forms a brush seal, the method comprising the steps of:
   providing a bristle arrangement consisting essentially of a plurality of bristles secured together by a joint;
   severing said bristle arrangement only to form free ends; and
   joining said free ends together.

2. The method as recited in claim 1, wherein said severing step comprises removing a section from, or adding a section to, said bristle arrangement, wherein said section consists essentially of a plurality of bristles secured together by a joint.

3. The method as recited in claim 2, wherein said section is an arcuate section.

4. The method as recited in claim 3, wherein said removing or adding step produces said free ends on said bristle arrangement.

5. The method as recited in claim 2, wherein said removing or adding step alters the size of said bristle arrangement.

6. The method as recited in claim 1, wherein said joining step comprises welding, brazing, or adhering.

7. A method of making a brush seal comprising the steps of:
   providing a bristle arrangement;
   severing said bristle arrangement, said bristle arrangement now having free ends;
   joining said free ends to form a modified bristle arrangement; and
   securing said modified bristle arrangement between a first plate and a second plate to form a brush seal.

8. A method of reworking a bristle arrangement, which in subsequent combination with a first and second plate forms a brush seal, the method comprising the steps of:
   providing a bristle arrangement consisting essentially of a plurality of bristles secured together by a joint, said bristle arrangement only having an unsuitable section;
   removing said unsuitable section from said bristle arrangement only; and
   adding a replacement section to said bristle arrangement only.

9. The method as recited in claim 8, wherein said replacement section is the same size as said unsuitable section.

10. The method as recited in claim 8, wherein said unsuitable section is an arcuate section.

11. A method of reworking a brush seal, comprising the steps of:
    providing a bristle arrangement having an unsuitable section;
    removing said unsuitable section from said bristle arrangement;
    adding a replacement section to said bristle arrangement to form a modified bristle arrangement; and
    securing said modified bristle arrangement between a first plate and a second plate to form the brush seal.

* * * * *